United States Patent [19]
Holland

[11] Patent Number: 5,117,532
[45] Date of Patent: Jun. 2, 1992

[54] TAILGATE GUARD APPARATUS

[76] Inventor: Donald J. Holland, 158 Bittercreek Dr., Folsom, Calif. 95630

[21] Appl. No.: 723,772

[22] Filed: Jul. 1, 1991

[51] Int. Cl.⁵ .............................................. E05D 11/00
[52] U.S. Cl. ....................................... 16/250; 16/223; 16/221
[58] Field of Search ......................... 16/250, 221, 223; 296/50, 57.1, 180.1

[56] References Cited

U.S. PATENT DOCUMENTS

| | | | |
|---|---|---|---|
| 2,586,757 | 2/1952 | Wummel et al. | 16/250 |
| 4,136,905 | 1/1979 | Morgan | 296/50 |
| 4,763,944 | 8/1988 | Fry et al. | 296/50 |
| 4,930,834 | 6/1990 | Moore | 296/50 |
| 4,932,705 | 6/1990 | Miller | 296/50 |

Primary Examiner—Robert L. Spruill
Assistant Examiner—Donald M. Gurley
Attorney, Agent, or Firm—Leon Gilden

[57] ABSTRACT

A tailgate guard apparatus is arranged for securement to the confronting hinge plate walls defining a gate opening between the spaced side walls of a conventional pickup truck bed to effect covering of the various tailgate linkage typically deposed on removal of a conventional tailgate for securement of a gate opening flexible web within the gate opening defined between the spaced hinge plates.

5 Claims, 4 Drawing Sheets

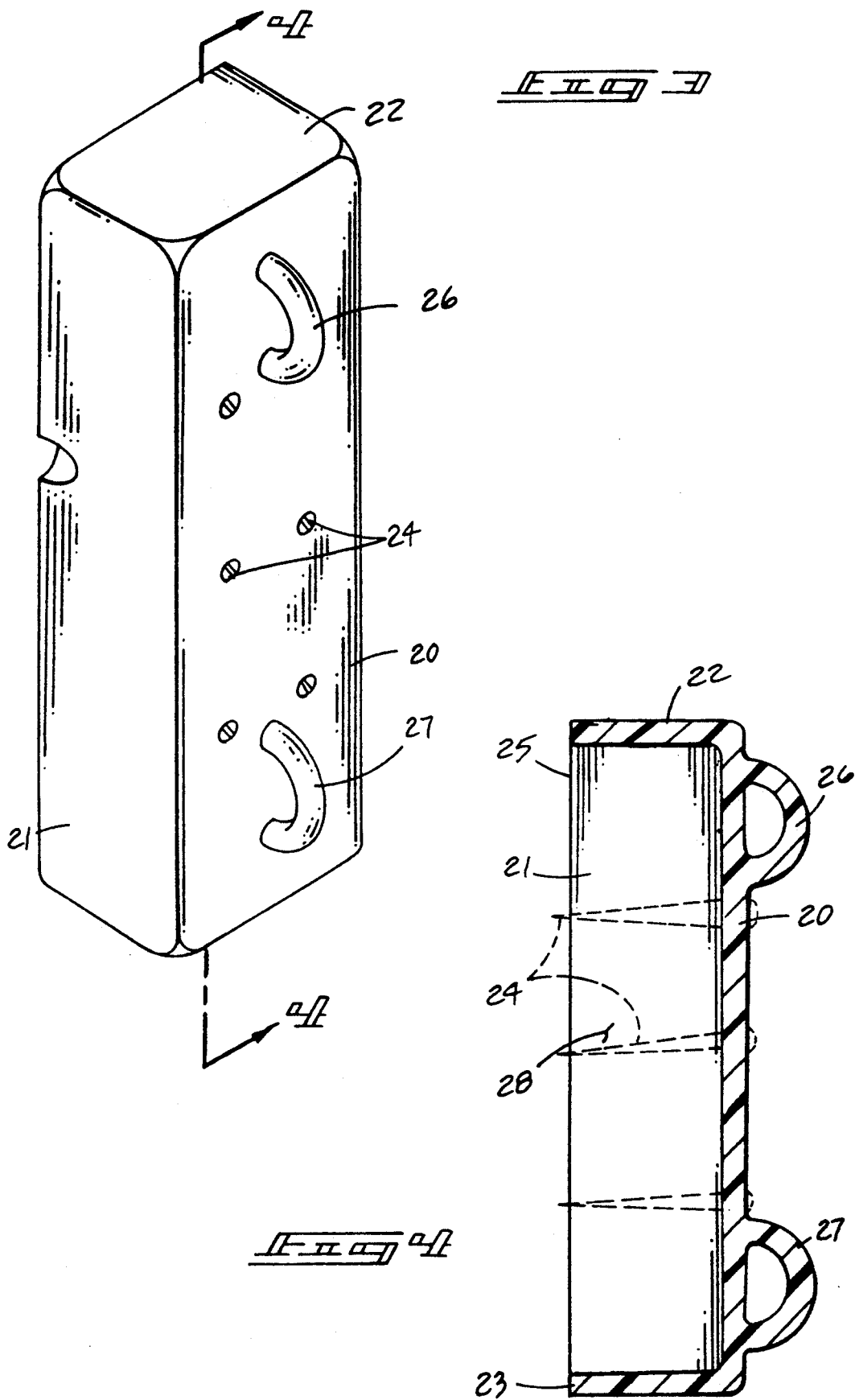

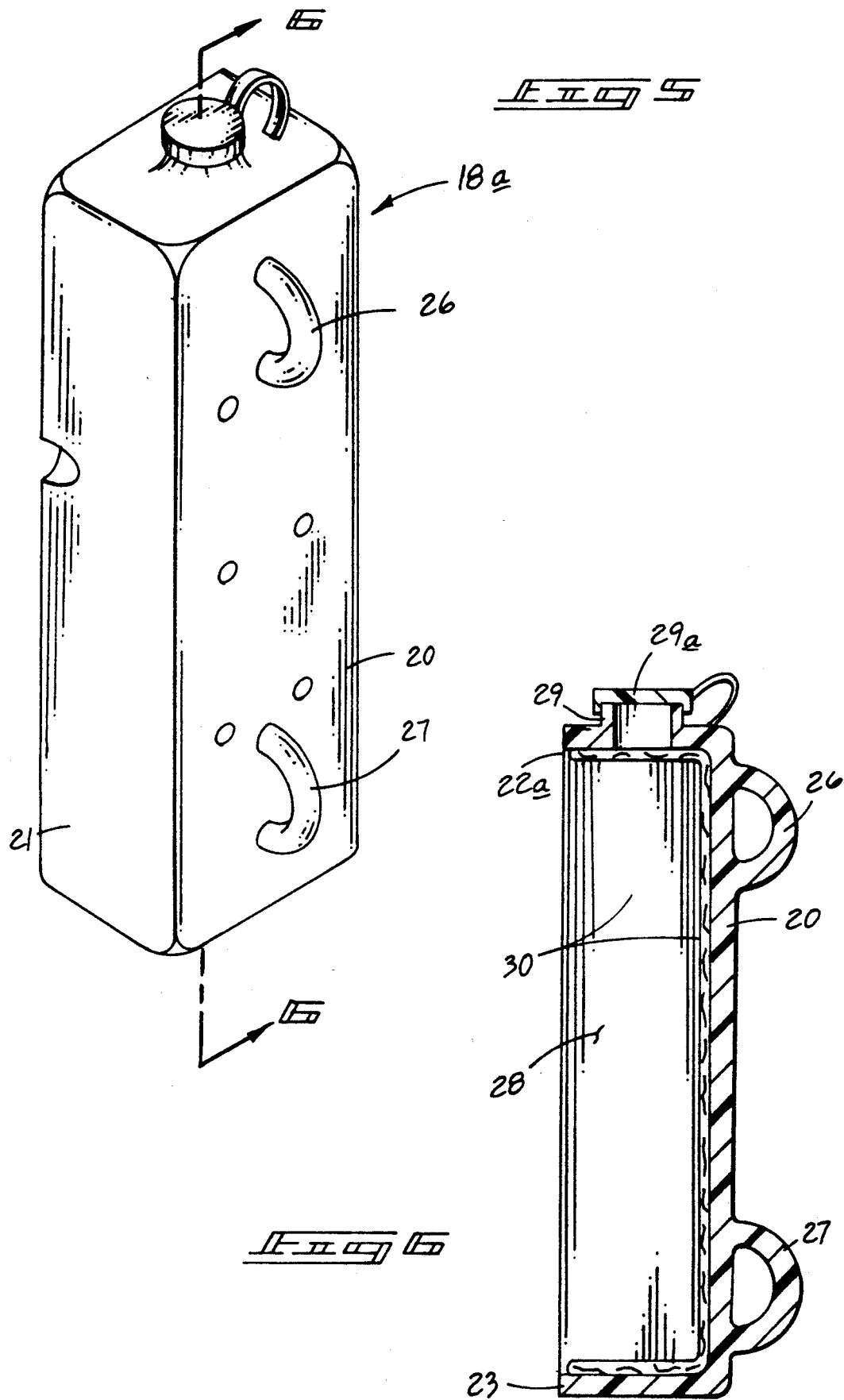

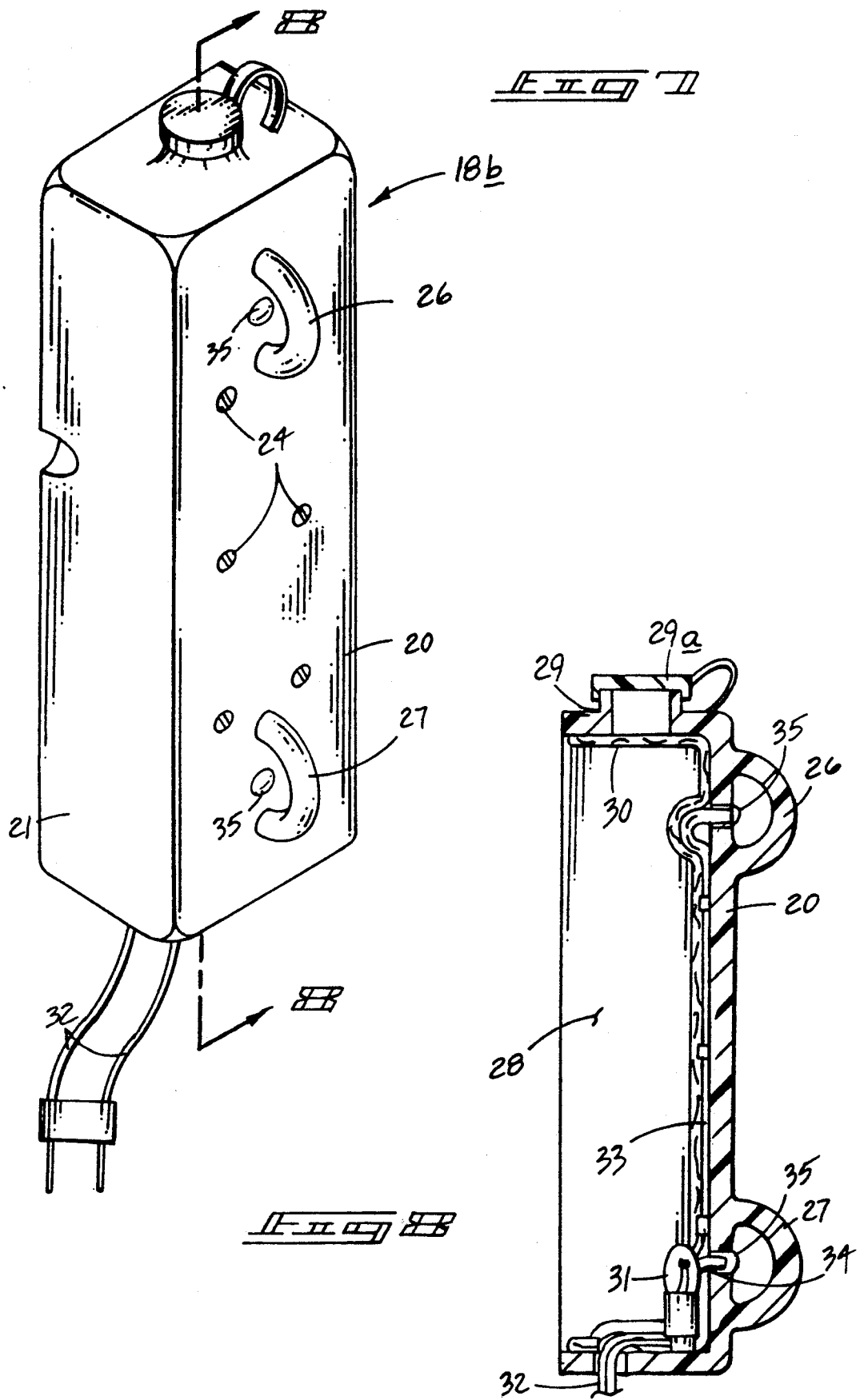

TAILGATE GUARD APPARATUS

BACKGROUND OF THE INVENTION

1. Field of the Invention

The field of invention relates to tailgate apparatus, and more particularly pertains to a new and improved tailgate guard apparatus wherein the same is arranged for affording protection covering to tailgate linkage and bracketry exposed during removal of conventional tailgates within a pickup truck bed.

2. Description of the Prior Art

Pickup truck tailgates are typically removed for convenience of access into a pickup truck bed and for removal of the wind resistance typically presented by the orientation of a pickup truck tailgate within the opening defined between the side walls of a conventional pickup truck. Prior art tailgate replacement structure is illustrated for example in U.S. Pat. No. 4,353,589 to Hartberg setting forth a tailgate type construction utilizing a mesh member to permit free-flow of air passage therethrough to minimize air resistance during traverse of a pickup truck bed.

U.S. Pat. No. 4,763,944 to Fry, et al. sets forth a tailgate covering utilizing upper and lower straps for securement to plate members by upper and lower loops.

U.S. Pat. No. 4,136,905 to Morgan sets forth a tailgate providing air permeability therethrough to minimize wind resistance.

U.S. Pat. No. 4,930,834 to Moore sets forth a fabric tailgate providing a mesh-type construction for covering a tailgate opening in a pickup truck bed.

Accordingly, it may be appreciated that there continues to be a need for a new and improved tailgate guard apparatus as set forth by the instant invention which addresses both the problems of ease of use as well as effectiveness in construction arranged to provide covering of the cover housings within a tailgate to effect covering of the tailgate linkage.

SUMMARY OF THE INVENTION

In view of the foregoing disadvantages inherent in the known types of tailgate apparatus now present in the prior art, the present invention provides a tailgate guard apparatus wherein the same utilizes cover housings to effect covering of the linkage mounted within the confronting hinge plates of a pickup truck bed. As such, the general purpose of the present invention, which will be described subsequently in greater detail, is to provide a new and improved tailgate guard apparatus which has all the advantages of the prior art tailgate apparatus and none of the disadvantages.

To attain this, the present invention provides a tailgate guard apparatus arranged for securement to the confronting hinge plate walls defining a gate opening between the spaced side walls of a conventional pickup truck bed to effect covering of the various tailgate linkage typically deposed on removal of a conventional tailgate for securement of a gate opening flexible web within the gate opening defined between the spaced hinge plates.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tailgate guard apparatus which has all the advantages of the prior art tailgate apparatus and none of the disadvantages.

It is another object of the present invention to provide a new and improved tailgate guard apparatus which may be easily and efficiently manufactured and marketed.

It is a further object of the present invention to provide a new and improved tailgate guard apparatus which is of a durable and reliable construction.

An even further object of the present invention is to provide a new and improved tailgate guard apparatus which is susceptible of a low cost of manufacture with regard to both materials and labor, and which accordingly is then susceptible of low prices of sale to the consuming public, thereby making such tailgate guard apparatus economically available to the buying public.

Still yet another object of the present invention is to provide a new and improved tailgate guard apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a cover housing utilized by the instant invention.

FIG. 4 is an orthographic view, taken along the lines 4—4 of FIG. 3 in the direction indicated by the arrows.

FIG. 5 is an isometric illustration of a modified cover housing utilized by the instant invention.

FIG. 6 is an orthographic view, taken along the lines 6—6 of FIG. 5 in the direction indicated by the arrows.

FIG. 7 is an isometric illustration of a further modified cover housing utilized by the instant invention.

FIG. 8 is an orthographic view, taken along the lines 8—8 of FIG. 7 in the direction indicated by the arrows.

DESCRIPTION OF THE PREFERRED EMBODIMENT

Figure 1:
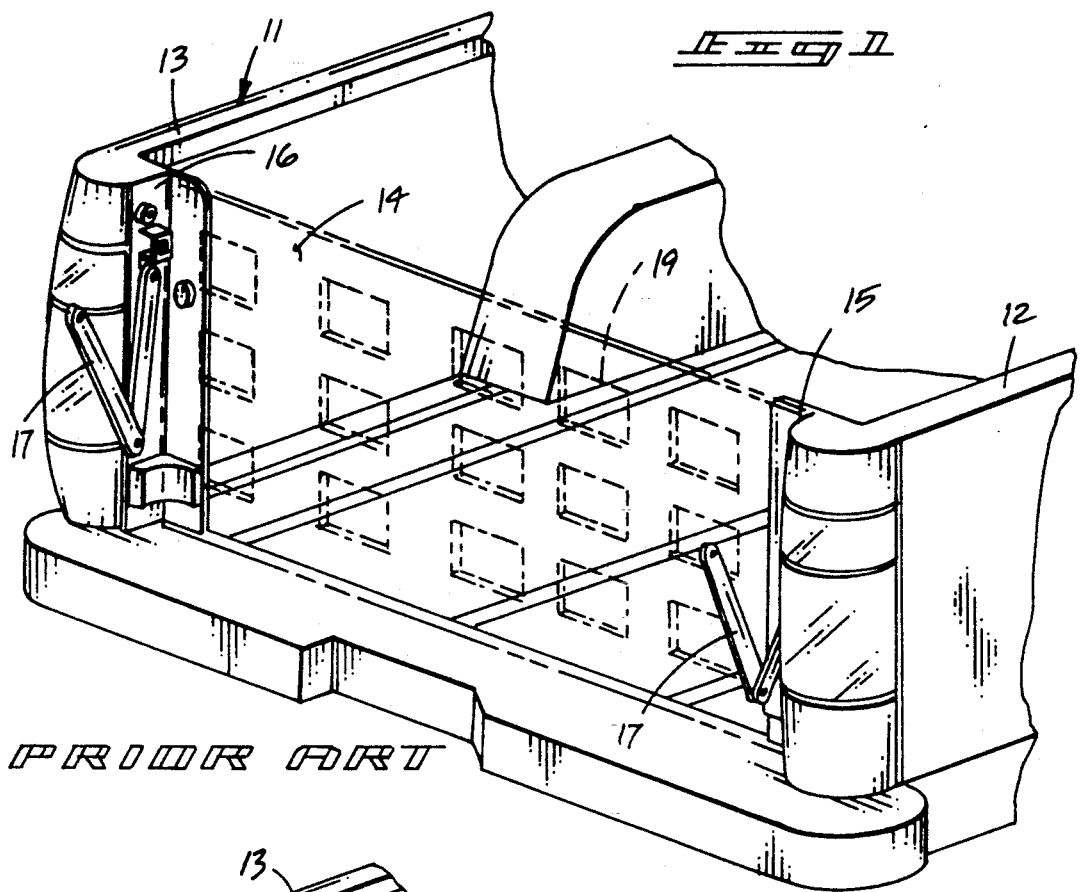
FIG. 1 is an isometric illustration of a conventional tailgate construction within a pickup truck.
Figure 2:
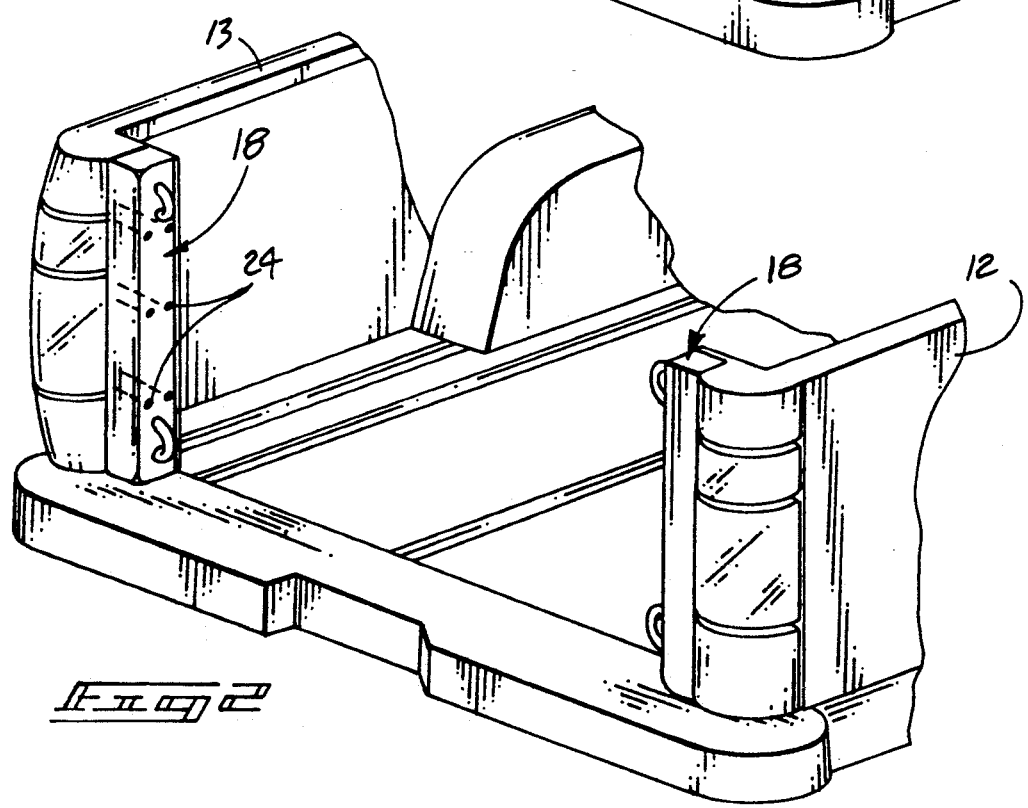
FIG. 2 is an isometric illustration of the cover housing as utilized in combination with a pickup truck bed permitting combination of a flexible web to be directed between the housings.

With reference now to the drawings, and in particular to FIGS. 1 to 8 thereof, a new and improved tailgate guard apparatus embodying the principles and concepts of the present invention and generally designated by the reference numeral 10 will be described.

FIG. 1 illustrates a pickup truck bed 11 of conventional construction formed with a respective first and second side wall 12 and 13 in an opposed spaced relationship relative to one another, defining a respective gate opening 14 defined within respective first and second side wall hinge plates 15 and 16 that are in a parallel aligned and confronting relationship relative to one another. Each hinge plate includes typical tailgate mounting linkage 17 and associated bracketry for mounting of a tailgate illustrated as removed for positioning of a gate opening flexible web 19, of a type as typified in U.S. Pat. No. 4,763,944 incorporated herein by reference, for securement to upper and lower loops of an associated support housing.

The invention includes a cover housing 18 for coextensive overlying relationship relative to each hinge plate 15 and accordingly is of a predetermined height substantially equal to a predetermined height defined by each hinge plate, and a predetermined width defined by each hinge plate. The cover housing includes a front wall 20, spaced parallel side walls 21, a top wall 22, and a bottom wall 23 to define a housing cavity 28 therewithin. A matrix of fasteners 24 are orthogonally projected through the front wall 20 and are defined by a predetermined length substantially greater than a predetermined depth defined by each of the walls 21, 22, and 23. The walls define a continuous perimeter edge 25 for abutment relative to an associated hinge plate. The fasteners accordingly are directed from the front wall 20 into the hinge plate for securement of the housing thereto to effect covering of the various components, such as the linkage and bracketry as noted above.

A top loop 26 and a bottom loop 27 are in an aligned relationship orthogonally and integrally mounted to the front wall 20 for securement of the typical strap structure of a covering web 19 thereto.

FIGS. 5 and 6 illustrate a modified housing 18a that includes a modified top wall 22a mounting a reservoir 29, with a reservoir cap 29a removably mounted relative to the reservoir that projects above the top wall 22a. A fluid absorbent liner 30 is substantially coextensive within the interior surface of the walls of the housing positioned within the cavity 28 to absorb a lubricating fluid to be positioned within the reservoir 29. In this manner, moisture and the like will not deteriorate the linkage and bracketry mounted on the hinge plates 15 and 16 and provide protection against corrosion and other such deterioration of the linkage 17 and the like.

A further modification of the housing 18b, as illustrated in FIGS. 7 and 8, additionally includes an electrical transmission line 32 for interconnection to the electrical system of the associated pickup truck and directed interiorly of the cavity 28 for illumination of the illumination bulb 31. It is of course understood that should it be desired, conventional battery power may be provided separate from the associated vehicular battery power to effect illumination of the illumination bulb 31 in a selective manner. The illumination bulb 31 is in contiguous communication with a respective first and second fiber optic cable 33 and 34. The first fiber optic cable 33 is directed upwardly of the interior surface of a front wall 20 and projects medially of the top loop 26 with a lens cover 35. This effects illumination of the top loop and orientation thereof, wherein the second fiber optic cable 34 in contiguous communication with the illumination bulb 31 is directed through a lower opening positioned medially of the bottom loop 27 to effect illumination thereof and its orientation relative to the housing 18a. In this manner, positioning and orientation of the loops 26 and 27 are provided to permit ease of securement of the web 19 during periods of limited illumination, such as during evening hours, to permit an individual to effect removal and replacement of the web 19.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A tailgate guard apparatus for securement to a rear portion of a vehicle, defining a pickup truck bed, wherein the pickup truck bed includes a first side wall spaced from a second side wall defining a gate opening therebetween, the gate opening including a first side wall hinge plate spaced from and parallel a second hinge plate, wherein the first and second hinge plates are in a parallel aligned confronting relationship relative to one another, the first hinge plate and the second hinge plate defined by a predetermined height and a predetermined width, and the apparatus comprising, a cover housing for securement to the first hinge plate and the second hinge plate, wherein the cover housing is defined by the predetermined height and the predetermined width, the cover housing including a front wall, a top wall spaced from and positioned above a bottom wall, and spaced side walls, the side walls, the top wall, the bottom wall defining a continuous perimeter edge, and each of the side walls, top wall, and bottom wall defined by a predetermined depth to define a housing cavity within the housing, and a matrix of fasteners defined by a predetermined length greater than the predetermined depth directed through the front wall for securement to a hinge plate of said first hinge plate and said second hinge plate.

2. An apparatus as set forth in claim 1 wherein the front wall includes a top loop and a bottom loop, the top loop and bottom loop arranged in an aligned relationship relative to one another and integrally and orthogonally mounted to the front wall.

3. An apparatus as set forth in claim 2 wherein the top wall includes a reservoir extending above the top wall and directed interiorly of the housing cavity, and a fluid absorbent liner substantially coextensively mounted within an interior surface defined by the housing cavity interiorly of the side walls, top wall, bottom wall, and front wall.

4. An apparatus as set forth in claim 3 including an illumination bulb mounted within the housing cavity, and a first opening directed through the front wall medially of the top loop, and a second opening directed through the front wall medially of the bottom loop, and a first fiber optic cable positioned adjacent the illumination bulb directed from the illumination bulb to the housing cavity and terminating through the first opening, and a second fiber optic cable positioned adjacent the illumination bulb extending through the second opening, and the illumination bulb arranged for selective illumination to effect illumination of the first fiber optic cable and the second fiber optic cable projecting through the first opening and second opening respectively.

5. An apparatus as set forth in claim 4 including an upper lens cover positioned in an overlying relationship relative to the first opening, and a lower lens cover positioned in an overlying relationship relative to the second opening, wherein each lens cover is transparent.

* * * * *